US012179506B2

(12) United States Patent
Clement

(10) Patent No.: US 12,179,506 B2
(45) Date of Patent: Dec. 31, 2024

(54) DECOR PAPER OR FOIL

(71) Applicant: Unilin, BV, Wielsbeke (BE)

(72) Inventor: Benjamin Clement, Waregem (BE)

(73) Assignee: Unilin, BV, Wielsbeke (BE)

( * ) Notice: Subject to any disclaimer, the term of this patent is extended or adjusted under 35 U.S.C. 154(b) by 0 days.

(21) Appl. No.: 17/859,882

(22) Filed: Jul. 7, 2022

(65) Prior Publication Data

US 2022/0339953 A1 Oct. 27, 2022

Related U.S. Application Data

(63) Continuation of application No. 17/289,567, filed as application No. PCT/IB2019/059877 on Nov. 18, 2019, now Pat. No. 11,413,898.

(30) Foreign Application Priority Data

Nov. 20, 2018 (EP) .................................... 18207323

(51) Int. Cl.
*B41M 5/50* (2006.01)
*B44F 9/02* (2006.01)

(52) U.S. Cl.
CPC ............... *B41M 5/502* (2013.01); *B44F 9/02* (2013.01)

(58) Field of Classification Search
CPC .................................. B41M 5/502; B44F 9/02
USPC ............................................ 428/211.1, 32, 1
See application file for complete search history.

(56) References Cited

U.S. PATENT DOCUMENTS

2001/0024218 A1* 9/2001 Inui ........................ B41J 19/142 347/41
2002/0107304 A1* 8/2002 Leu ........................ C09D 11/32 347/100
2009/0073205 A1 3/2009 Liu et al.
2014/0055520 A1* 2/2014 Inumaru .............. C09D 11/322 347/21
2015/0036890 A1 2/2015 Biró et al.
2016/0332479 A1 11/2016 Clement et al.
2017/0348978 A1 12/2017 Van Garsse
2018/0072907 A1 3/2018 Balan
2020/0185545 A1* 6/2020 Che ................... H01L 31/02162
2022/0339953 A1* 10/2022 Clement ................ B41M 5/502

FOREIGN PATENT DOCUMENTS

CN 107278332 A * 10/2017 ............. C09D 11/52
DE 19916546 A1 10/2000
DE 60008321 T2 11/2004
DE 102010024785 A1 12/2011

(Continued)

*Primary Examiner* — Betelhem Shewareged

(74) *Attorney, Agent, or Firm* — Capitol City TechLaw

(57) ABSTRACT

A decor paper or foil for application to panel shaped substrates may include a base layer, an inkjet receiving surface, and a digitally printed pattern. The digitally printed pattern may be obtained by printing with a single-pass printer. The digitally printed pattern may include a matrix of a plurality of printed ink dots per inch. The matrix, in the width direction of the paper or foil, may be uniformly made up with uniformly sized printed ink dots, with the exception of a minority of an area of the printed pattern, in which the matrix may be modified. The modification may include the presence of one or more printed dots in the matrix which have a smaller or a larger dot size.

13 Claims, 4 Drawing Sheets

(56) References Cited

FOREIGN PATENT DOCUMENTS

| | | | |
|---|---|---|---|
| DE | 102012219473 | A1 | 8/2014 |
| EP | 1044822 | B1 | 10/2000 |
| EP | 1290290 | B1 | 3/2003 |
| EP | 1749676 | B1 | 2/2007 |
| EP | 1857511 | B1 | 11/2007 |
| EP | 1872959 | B1 | 1/2008 |
| EP | 2132041 | B2 | 12/2009 |
| EP | 2209653 | B2 | 7/2010 |
| EP | 2274485 | B2 | 1/2011 |
| EP | 2293946 | B1 | 3/2011 |
| EP | 2431190 | B1 | 3/2012 |
| EP | 3199360 | A1 | 2/2017 |
| WO | 2009/056352 | A1 | 5/2009 |
| WO | 2011124503 | A2 | 10/2011 |
| WO | 2014024100 | A1 | 2/2014 |
| WO | 2015118451 | A1 | 8/2015 |
| WO | 2018229649 | A1 | 12/2018 |
| WO | 2020065087 | A1 | 4/2020 |

* cited by examiner

DECOR PAPER OR FOIL

This application is a continuation application of U.S. patent application Ser. No. 17/289,567 filed Apr. 28, 2021, which is US National Phase application of International Application No. PCT/IB2019/059877 filed Nov. 18, 2019, the entire contents of both of which are incorporated herein by reference.

This application claims priority under 35 USC § 119(a)-(d) to EP patent application No. 18207323.9, which was filed on Nov. 20, 2018, the entire contents of which are incorporated herein by reference.

BACKGROUND

1. Field

The present invention relates to decor paper or decor foil which may be used in a method for manufacturing panels having a decorative surface, or, so-called decorative panels.

More particularly the invention may relate to a method for manufacturing laminate panels, wherein said panels at least comprise a substrate material and a provided thereon top layer with a printed decor. The top layer is formed from thermosetting resin and one or more paper layers, wherein said paper layers comprise a decor paper having a printed pattern. The panels of the invention may relate to furniture panels, ceiling panels, flooring panels or similar, wherein these panels preferably comprise a wood based substrate, such as an MDF or HDF substrate (Medium or High Density Fiberboard) or a substrate material consisting of, or essentially made of, wood particleboard.

2. Related Art

Traditionally, the decor or pattern of such panels is printed on paper by means of offset or rotogravure printing. The obtained paper is taken up as a decorative paper in a so called laminate panel. According to the DPL process (Direct Pressure Laminate) the already printed paper or decorative paper is provided with melamine resin to form a decorative layer. Afterwards a stack is formed comprising at least a plate shaped substrate, said decorative layer and possibly a protective layer on top of said decorative layer, wherein said protective layer or overlay is based on resin and/or paper as well. Said stack is pressed and the press treatment results in a mutual connection or adherence of the decorative paper, the substrate and the protective layer, as well as in a hardening of the resin present in the stack. As a result of the pressing operation a decorative panel is obtained having a melamine surface, which can be highly wear resistant. At the bottom side of the plate shaped substrate a counter layer or balancing layer can be applied, or as an alternative a decorative layer might be attached to the bottom side as well, especially in the case of laminate panels for furniture. Such a counter layer or balancing layer or any other layer at the bottom side of the laminate panel restricts or prevents possible bending of the decorative panel, and is applied in the same press treatment, for example by the provision of a resin carrying paper layer as the lowermost layer of the stack, at the side of the stack opposite said decorative layer. For examples of a DPL process reference is made to the EP 1 290 290, from which it is further known to provide a relief in said melamine surface during the same press treatment or pressing operation, namely by bringing said melamine surface in contact with a structured press element, for example a structured press plate.

The printing of paper by means of an analog printing process, such as by rotogravure or offset printing, at affordable prices inevitably leads to large minimal order quantities of a particular decorative paper and restricts the attainable flexibility. A change of decor or pattern necessitates a standstill of the printing equipment of about 24 hours. This standstill time is needed for exchange of the printing rollers, the cleaning of the printing equipment and for adjusting the colors of the new decor or pattern to be printed.

Providing the printed paper with resin can lead to expansion of the paper, which is difficult to control. Problems can arise, particularly in the cases where, like in the EP 1 290 290, a correspondence between the relief and the printed decor is desired.

Instead of analog printing techniques, digital printing techniques, especially inkjet printing technique, are becoming increasingly popular for the creation of decors or patterns, be it on paper or directly on a plate-shaped substrate possibly with the intermediary of preparatory layers. Such digital techniques can enhance the flexibility in the printing of decors significantly. Reference is made to the EP 1 872 959, WO 2011/124503, EP 1 857 511, EP 2 431 190, EP 2 293 946, WO 2015/118451 and EP 2 132 041 where such techniques are disclosed.

EP 1 044 822, EP 1 749 676 and EP 2 274 485 disclose the use of an inkjet receiver coating to enhance the printing quality on a raw decorpaper. Such inkjet receiver coating comprises pigments and a polymer, or binder, such as polyvinyl alcohol. WO 2015/118451 recognizes that non uniform application of the inkjet receiver coating may lead to unacceptable defects that become visible only after printing. Indeed when the inkjet receiver coating is unevenly applied, the amount of bleeding of the subsequently applied inks may vary in accordance with the distribution of the inkjet receiver coating. Typically zones of lesser print quality will be observed extending in the application direction of the coating. WO 2015/118451 proposes to alleviate this problem by also having the printed wood pattern extend with its wood nerves in the application direction, such that the inadvertent production variation may be mistaken for a natural aspect of the wood grain.

It is further known, for example from US 2009/073205, and it is good practice, to calibrate the nozzles and/or print heads of an inkjet printer to ensure the firing of equally sized ink droplets. It is further known, e.g. from WO 2014/024100 that nozzles and/or print heads may be used in so-called grey-scale or halftone modus, wherein the size of the fired ink droplets is adapted in accordance with the printed pattern to be obtained.

The present inventor however has noticed that the techniques available in the prior art still lead to a print quality which is inferior to that of analog printed decor paper or foil, and may be unacceptable for high quality products, such as floor panels mimicking parquet or natural stone. Especially with printed patterns representing a wood grain or stone surface, problems such as banding and missing nozzles emphasize the synthetic nature of the imitation product. Banding is a phenomenon wherein the intensity of the colors appear different in longitudinal areas of the print. The term "missing nozzles" refers to nozzles that are clogged, and for this or for another reason, stopped firing droplets, thereby given rise to a white line in the printed pattern. Problems of banding and missing nozzles are especially significant in single pass printing. In single pass printing the printed pattern is applied in one continuous movement of the paper or foil passed the print engine, and a slight imperfection in a print head may lead to visible variations in color intensity.

Unlike multi-pass printing, a subsequent printing step which may hide imperfections in a first printing step is absent.

SUMMARY

The present invention aims in the first place at an alternative decor paper or foil, and seeks, in accordance with several of its preferred embodiments, to solve one or more of the problems arising in the state of the art.

Therefore the present invention, in accordance with its first independent aspect, is a decor paper or decor foil for application to panel shaped substrates, wherein said decor paper or foil comprises a base layer, an inkjet receiving surface, and a digitally printed pattern, preferably obtained via printing with a single-pass printer, and including a matrix of a plurality, preferably at least 200, printed ink dots per inch, with as a characteristic that said matrix, as seen in the width direction of the paper or foil, is generally uniformly made up with uniformly sized printed ink dots, with the exception of a minority of the area of the digitally printed pattern wherein said matrix is modified. The modification of the matrix is preferably repeated over essentially the entire length of the printed pattern, or, even over the entire length of said decor paper or foil which is printed. In other words, it is preferred that said minority of the area continuously extends in the length direction of said decor paper or foil.

It is clear that the single pass printer preferably has a print unit, comprising one or more print heads, extending in the width direction of the paper or foil, and that the length direction of the paper or foil coincides with the direction of motion relative to the print unit. The print unit, comprising the one or more print heads, extends at least the entire width of the surface of the paper or foil to be printed, or preferably even the entire width of the surface of the paper, irrespective whether it is to be printed or not. Preferably, said single pass printer has a print unit capable of printing a pattern with a width of at least 1250 mm, or at least 1550 mm, or at least 2000 mm. It is in particular with such large printers that color intensity variations may prove difficult to deal with using prior art techniques, especially in cases where the digitally printed pattern represents a wood grain or stone pattern. The matrix which is modified in accordance with the invention then preferably is obtained due to a modification of the firing properties of one or more of said print heads, wherein such modification is repeated essentially over the entire length of the printed pattern, or, even over the entire length of said decor paper of foil which is printed. It is clear that each print head may comprise a plurality of nozzles, and that said modification may be due to an adaptation of the firing properties of one or more such nozzles.

The aforementioned modification of the ink dot matrix may be put to practice in accordance with several possibilities, of which three are listed here below, without desiring to be exhaustive.

According to a first possibility said modification at least comprises the availability of additional printed dots in said matrix. Providing additional dots leads to a local raise of the color intensity. Such raise of the color intensity may be used to hide missing dots, or to compensate for variations in the color intensity which are undesired.

According to a second possibility said modification at least comprises the absence of printed dots from said matrix. Leaving out dots from the matrix leads to a local decrease of the color intensity. Such decrease may be used to cope with undesired variations in the color intensity.

According to a third possibility said modification at least comprises the availability of one or more printed dots in said matrix which have a smaller or larger dot size. Changing the dot size, and in particular using a dot size different from the generally applied dot size, can be used for controlling the color intensity in order to bring it within the level desired.

It is clear that a matrix may also be modified in accordance with two or more of the above listed possibilities.

The modification of the matrix as seen in width direction of the decor paper or decor foil may concern an individual dot, a pair of dots or a series of dots smaller than six dots. Individual dots may for example be used to hide mispositioning of ink dots. Pairs of dots may for example be used to hide a missing nozzle or missing ink dot.

It is clear that said modification of the ink dot matrix preferably forms a correction for color intensity variations, which would otherwise manifest themselves in the width direction, i.e. in the direction in which the print unit extends over the paper or foil.

The inventor has noted that modifying the ink dot matrix by adapting the dot size of some of the printed ink dots, e.g. by setting the relevant nozzle of the single-pass printer to repeatably fire larger or smaller droplets than the general size of droplets fired from the majority of the nozzles, offers an interesting opportunity to cope with imperfections such as banding and missing nozzles. In the case of a missing nozzle, for example, the adjacent nozzles may be set to repeatably fire larger droplets. In the case of a nozzle recording an ink dot on the paper or foil at a widthwise shifted position, the size of the droplet and the resulting ink dot may be enlarged, possibly in combination with the size of a droplet making up an adjacent ink dot being decreased, to compensate for the shift. In the case of banding in particular areas, such as for example at a position corresponding to the lateral ends of a print head, the droplets sizes may be altered to obtain a constant intensity of the colors also near one or both lateral ends of the respective print head.

The modification of the ink dot matrix, e.g. a modified dot size of a relevant printed ink dot, is preferably kept constant during the printing operation, such that the modification or modified dot size is present over the entire length of said line of dots. According to a variant, it may prove to be useful to vary the modification over the length of said line of dots, and/or to use a modified dot with intervals, e.g. every second, or every third dot along the length of said line of dots. For example, when a mid-size dot is needed along the length of the dot line to mask a certain imperfection, a large size and a small size dot may be alternatingly present along the length of the dot line, such that in average the amount of deposited ink is that of a mid-size dot. Preferably, as seen in length direction, namely along the line of dots fired from the same nozzle, the pattern of the modification is repeated with a repeat length of six dots or shorter.

It is clear that the modified matrix of ink dots of the invention preferably comprises correcting dots, such as dots correcting banding issues, missing nozzles, or correcting nozzles recording mispositioned ink dots. Such imperfections of the digital print are preferably defined on the basis of an earlier printed image, and the modification of the dot matrix is preferably performed over a considerable printing length, for example at least more than 1 meter, but preferably more than 10 meter, or for the entire or practically the entire stretch of the decor paper of foil to be printed. The above mentioned earlier printed image which may be taken to be a basis for defining the desired correcting dots, may be a test image, such as an image containing areas of at least 1 square centimeter printed with the basic colors applied by the relevant printer, for example areas of cyan, yellow, and possibly magenta, black and/or red or brown. Preferably, such test image is obtained at least by firing ink droplets from all nozzles, each along a dot line of at least 1 centimeter. Preferably, however, larger areas and dot line lengths are contained in the test image. Preferably areas, which extend over the entire width of the decor paper each made up from ink dots of only one basic color, are available in the test image. Preferably such areas are printed for several ink loads, e.g. in steps of 5% ink load increase.

It is clear that the present invention, in accordance with a second independent aspect, and with the same aim as in the first independent aspect, also relates to a decor paper or foil for application to panel shaped substrates, wherein said decor paper or decor foil comprises a base layer, an inkjet receiving surface, and a digitally printed pattern, preferably obtained via printing with a single-pass printer having one or more inkjet heads, wherein such inkjet head comprises a plurality of nozzles for firing ink droplets, each droplet forming an ink dot, wherein said digital print includes a matrix of a plurality, preferably at least 200, printed ink dots per inch, with as a characteristic that said digital print comprises areas wherein said matrix is corrected on a nozzle level. As mentioned in the first aspect, such correction is preferably based on an earlier printed image, e.g. on a test image or on an earlier portion of said decor paper or foil.

It is clear that the correction or adaptation of said second independent aspect preferably is one or a combination of two or more of:

- the adaptation at least comprises addition of extra printed dots to said matrix; and/or
- the adaptation at least comprises omission of printed dots from said matrix; and/or
- the adaptation at least comprises modification of the dot size of one or more of the printed dots comprised in said matrix; and/or
- the adaptation at least comprises a shifted dot position of the relevant printed ink dots.

Here below some preferred embodiments are listed which may be combined with either the first, or the second, or both independent aspects of the present invention.

It is clear that the definition or resolution of the digitally printed pattern is, in accordance with the first and/or second aspect of the invention, at least 200 dots per inch (dpi) in the width direction and in the length direction of the paper or foil. Preferably, however the resolution is at least 600 dots per inch in both direction or higher.

Preferably for said ink or ink dots, use is made of a pigment based ink, preferably a water-based pigmented ink. Water-based inks are particularly cumbersome when it comes to clogging of nozzles. The present invention is hence ideally suited to alleviate the problems with such inks.

Said inkjet receiving surface may consist of the surface of the base paper layer or foil, or may comprise an inkjet receiver coating or layer comprising at least binder and/or pigments. Herein said pigments may be available in said inkjet receiver coating mainly in a layer adjacent the surface of the base paper or foil layer, while being absent, or present in a significantly lower amount, in an upper layer of said inkjet receiving coating. Further, an upper layer of said inkjet receiver coating may comprise an ink destabilizing agent, such as $CaCl2$. Preferably, for the inkjet receiver coating, use is made of an inkjet receiver coating as mentioned in WO 2018/229649, which is commonly owned.

An inkjet receiver coating comprising an ink reactive compound, such as a flocculating agent, can allow for a limited, but desirable dot gain. With "dot gain" the property is meant whereby an ink dot is recorded with a larger size than the diameter of the fired droplet, due to bleeding properties of the recording media, i.e. the paper or foil to be printed. A small non-zero dot gain is preferred in combination with the present invention such that the modified dot matrix may more easily blend in with the surrounding general matrix.

Generally speaking, pigments of inkjet inks are stabilized in the ink composition to attain a good dispersion in the ink vehicle and to avoid coagulation of the pigments, in particular in an attempt to avoid clogging of the nozzles in the inkjet heads. This stabilization is in inkjet inks obtained by means of electrosteric effect between the pigments. The ink reactive compound preferably is a substance that breaks up the stabilization of the pigments in the jetted droplets, or in other words an ink destabilizing agent. The ink reactive compound captures the ink, more particularly the pigments, upon the first interaction with it. By interfering or breaking up the electrosteric functions on the pigments, such that the pigments quickly precipitate from the ink mixture and are only minimally driven deeper into the coating together with the inks vehicle, to thereby create a limited dot gain. This only somewhat delayed immobilization of the pigment leads to a superior color density of the print.

The pigment and binder system of the ink receiver coating absorbs the vehicle of the ink, thereby also limiting bleeding, particularly while printing on paper, or smearing of the ink, particularly while printing on foils, which also in itself may lead to an enhanced printing quality.

The ink reactive compound may be chosen as one or more from several possibilities, of which here the most important possibilities are listed. According to a first possibility, said ink reactive compound comprises a polyionic polymer, preferably polyDADMAC (Polydiallyldimethylammonium chloride). An ionic polymer wholly or partly neutralizes the electrosteric function of the pigment in the ink, thereby quickly precipitating the pigment. According to a second possibility, said ink reactive compound comprises a substance altering, more particularly lowering, the pH of said inkjet receiver coating. Preferably the pH of the inkjet receiver coating composition is lowered to pH 3 or lower, by selecting the amount and type of said substance, which selection is within the ambit of the skilled man. Preferably said substance is chosen from the list consisting of formic acid, tartaric acid, acetic acid, hydrochloric acid, citric acid, phosphoric acid, sulfuric acid, $AlCl3$ and boronic acid. An adjusted, more particularly lowered pH, preferably to pH 3 or less, increases the chemical affinity of the inkjet receiver coating with the ink and will interfere with the electrosteric stabilization function on the pigment, such that the dispersion of the pigments in the ink will become destabilized quickly. According to a third possibility, said ink reactive compound comprises a metal salt, preferably a cationic metal salt. Preferably said metal salt is chosen from the list consisting of $CaCl2$, $MgCl2$, $CaBr2$, $MgBr2$, CMA (Calcium Magnesium Acetate), $NH4Cl$, Calcium Acetate, $ZrCl4$ and Magnesium Acetate. The positive ion of the dissolved metal salt will tend to neutralize the electrosteric stabilization function of the pigment. The most preferred cationic metal salts are $CaCl2$, $MgCl2$, CMA, Calcium Acetate and Magnesium Acetate, as the inventors have obtained the best results with these ink reactive compounds. According to a fourth possibility, said ink reactive compound comprises a flocculating agent. Preferably said flocculating agent is chosen from the list consisting of sodiumaluminate, a double sulphate salt such as alum, polyaluminumchloride, polyacrylate, dicyandiamide (e.g. Floquat DI5 from SNF) and polyacrylamide. The flocculating agent pulls the ink pigments out of the ink dispersion. Thereby the pigments are prevented from penetrating too far down into the ink receiver coating. Mainly the vehicle of the ink, e.g. the water in the case of waterbased inks, is absorbed deeper down into the ink receiver coating.

Preferably, said paper or foil is provided with 0.2 to 10 g/m$^2$, and preferably between 0.5 and 5 g/m$^2$, dry coating weight of ink reactive compound, more particularly ink destabilizing agent, in said inkjet receiver coating.

Preferably, said paper or foil is provided with 0.2 to 10 g/m$^2$, and preferably between 0.5 and 5 g/m$^2$, dry coating weight of a hygroscopic compound or pigment in said inkjet receiver coating. Preferably said pigment has a BET surface area between 10 and 1600 m$^2$/g, and preferably between 15 and 500 m$^2$/g. Preferably, the coating is such that the pigments create a surface of 100 m$^2$ to 16000 m$^2$ per m$^2$ surface area of paper or foil, or even better between 150 and 5000 m$^2$ of pigment surface per m$^2$ of paper or foil surface.

According to the most preferred embodiment, for the pigment of said inkjet receiver coating at least or mainly silica particles are used. Preferably the silica particles are silane treated. Silane treatment of the pigments, in general, enhances dust release properties of the attained inkjet receiver coating and the thus treated paper or thermoplastic foil. The silane treatment may relate to a treatment with a coupling agent such as amino-organo-silanes, hydroxysilanes, dipodal silanes and/or other silanes. Preferably, the coupling agent is chosen such that the risk of yellowing upon aging of the attained inkjet receiver coating is low. Preferably, the coupling agent forms 0.1 to 10% of the total wet weight of the inkjet receiver coating. According to variants, for the pigment of said inkjet receiver coating at least or mainly particles are used chosen from the list consisting of calcium carbonate, silica, alumina, aluminosilicates, ordered mesoporous materials, modified silica, organosilica, modified organosilica, organoalumina, modified alumina, aluminates, modified aluminates, organoaluminates, modified organoaluminates, zeolites, metal organic frameworks and porous polar polymers.

Preferably, said paper or foil is provided with 0.2 to 10 g/m$^2$, and preferably between 0.5 and 5 g/m$^2$, dry coating weight of a binder in said inkjet receiver coating. According to the most preferred embodiment, for the binder in said inkjet receiver coating at least or mainly polyvinyl alcohols are used. According to variants, the inkjet receiver coating includes, as a binder, a polymer selected from the group consisting of hydroxyethyl cellulose; hydroxypropyl cellulose; hydroxyethylmethyl cellulose; hydroxypropyl methyl cellulose; hydroxybutylmethyl cellulose; methyl cellulose; sodium carboxymethyl cellulose; sodium carboxymethylhydroxethyl cellulose; water soluble ethylhydroxyethyl cellulose; cellulose sulfate; vinylalcohol copolymers; polyvinyl acetate; polyvinyl acetal; polyvinyl pyrrolidone; polyacrylamide; acrylamide/acrylic acid copolymer; polystyrene, styrene copolymers; acrylic or methacrylic polymers; styrene/acrylic copolymers; ethylene-vinylacetate copolymer; vinylmethyl ether/maleic acid copolymer; poly(2-acrylamido-2-methyl propane sulfonic acid); poly(diethylene triamine-co-adipic acid); polyvinyl pyridine; polyvinyl imidazole; polyethylene imine epichlorohydrin modified; polyethylene imine ethoxylated; ether bond-containing polymers such as polyethylene oxide (PEO), polypropylene oxide (PPO), polyethylene glycol (PEG) and polyvinyl ether (PVE); polyurethane; melamine resins; gelatin; carrageenan; dextran; gum arabic; casein; pectin; albumin; chitins; chitosans; starch; collagen derivatives; collodion and agar-agar. The most preferred variants for the binder are polyvinyl acetates, ethylvinylacetates, block copolymers based on polyvinylacetate, block copolymers based on polyvinylalcohol, acrylates, latexes, polyvinyl derivaties, VCVAC derivatives, polyurethanes based on polyols and isocyanates, polyurethanes based on polycarbamates and polyaldehydes, e.g. both as a watery dispersion/emulsion or a watery or solvent solution.

As stated above preferred binders for the inkjet receiving coating or layer include polyvinyl alcohol (PVA), but according to variants a vinylalcohol copolymer or modified polyvinyl alcohol may be applied. The modified polyvinyl alcohol may be a cationic type polyvinyl alcohol, such as the cationic polyvinyl alcohol grades from Kuraray, such as POVAL C506, POVAL C118 from Nippon Goshei.

Preferably, said inkjet receiver coating has, globally seen, a pigment to binder ratio between 0/1 or 0.01/1 and 25/1, preferably between 0/1 or 0.01/1 and 20/1. It is not excluded that the inkjet receiver coating is non uniform and shows layerwise or areawise differences in composition, in which case the above values are average values for the totality of the inkjet receiver coating.

Preferably the decor paper or decor foil of the invention has a length exceeding 1000 meters, or even exceeding 3500 meter. It is clear that the decor paper or the decor foil of the invention may be available in rolled-up form.

Preferably the paper layer or thermoplastic foil onto which the inkjet receiver coating is applied has a base weight of 50 to 100 grams per square meter, e.g. between 60 and 80 grams per square meter.

Preferably, in the case of a paper layer, the side of the paper layer unto which the inkjet receiver coating is applied has been smoothened (German: geglättet), preferably during its production. The smoothening diminishes the amount of binder penetrating the paper's core, such that the pigments contained therein can be better bound by the available binder substance and variations in absorption may be less. Preferably, the base paper, i.e. without the ink receiving layer and the print, has a Gurley value of less than 30 seconds.

According to the most preferred embodiment said inkjet receiver coating is applied in at least two partial steps, wherein respectively a first layer with a first composition and, subsequently, a second layer is applied with a second composition, both compositions at least comprising said binder. The inventor has witnessed that the application of the inkjet receiver coating in two partial steps leads to a better incorporation or binding of the pigment. The risk of dust releasing from the paper is reduced as compared to a situation where the same amount of pigment is applied in only one coating step. The application of the inkjet receiver coating in two steps may further lead to a more even application of the entirety of the inkjet receiver coating. Where the first composition may be partly absorbed in the paper layer in a non-uniform manner, and therefor may lead to an uneven first layer having less effective portions, the second composition levels out the possible unevenness at least to some extent.

Preferably, in the case where the inkjet receiver coating is applied in two partial steps, said first layer and said second layer differ in that said first layer as well as said second layer comprise pigment and binder, albeit in a different pigment to binder ratio and/or that said second layer comprises binder and ink destabilizing agent, but is largely or entirely free from pigment, while the first layer comprises at least pigment and binder. Preferably said first composition has a pigment to binder ratio which is larger than the pigment to binder ratio of said second composition. In this way the binder of the second layer primarily binds the pigments of the first layer and levels out unevenness in the first layer. Preferably the pigment to binder ratio in said second composition is lower than 2:1, and preferably lays between 0:1 and 2:1. When the ratio in the second composition is below 1.5:1 an extremely low dust release has been witnessed. As expressed above, it is not excluded that, in some embodiments, said second composition is free from pigments.

Whether or not in combination with the mentioned preferred second composition, the pigment to binder ratio in said first composition may be chosen between 1:1 and 25:1 or between 2:1 and 10:1, and is preferably 3.5:1 or larger than 3.5:1, and even better 5.5:1 or larger than 5.5:1, though preferably smaller than 10:1.

A good combination of the first and second composition is reached when the ratio pigment to binder in the second composition is between 0:1 and 2:1 and the ratio pigment to binder in the first composition is between and including 3.5:1 and 10:1. It is clear, however, that within the scope of the present invention, the pigment to binder ratio of the first and second composition may be equal or substantially equal.

Preferably said second layer comprises a higher amount of said ink reactive compound than said first layer. The availability of the ink reactive compound at the upper layer of the coating leads to an effective interaction with the pigments of the jetted ink drops. The ink reactive compound preferably comprises a flocculating agent or another ink destabilizing agent, such as a cationic metal salt.

The binder used in the ink receiving layer in general, or, the binder comprised in the first and/or the second composition, may also be formed by a mixture of the above listed possibilities for such binder. According to a special embodiment a mixture of polyvinyl alcohol with ethylene vinyl acetate (EVA) and/or polyvinyl acetate (PVAc) is used as a binder, wherein preferably the main constituent of the binder is polyvinyl alcohol and, e.g. at least 5% by weight of EVA and/or PVAc is used. The inventor has recorded an increased flexibility of the thus treated papers or treated foils as compared to papers or foils where the binder is essentially polyvinyl alcohol. An increased flexibility with diminished dust release is advantageous in further handling of the thus treated paper and foils, e.g. in the printing equipment.

Preferably, the binder in the first and the second composition is the same, or, at least the main constituent of the binder is the same. As stated before, the main constituent is preferably polyvinyl alcohol.

For the silica particles preferably used in the inkjet receiving layer, especially preferred are the precipitated silica particles. The precipitated silica differs from fumed silica in point of the density of the surface silanol group and of the presence or absence of pores therein, and the two different types of silica have different properties. The inventors surprisingly noted that the use of precipitated silica as pigment in an inkjet receiver coating, in comparison with fumed silica, led to a higher color density of the print performed on such coating, and, a better adherence is achieved with transparent layers later to be laminated on top of the print. The inventors think that the higher smoothness of an inkjet receiver coating with fumed silica gives rise to the lower color density and lamination strength.

Preferably the pigments included in the inkjet receiver coating have an average particle size of 100 nm to 20 μm, wherein 1-12 μm, and even better 2 to 7 μm is ideal. Small particle size pigments can be easily bound to the paper or foil, while large particle size pigments show great water absorbency, thereby leading to a good printing quality. The optimum average particle size is in the range between 1 and 12 μm, preferably 2 to 7 μm. Preferably, the pigments included in the inkjet receiving layer have an average surface area of 20 to 1600 $m^2/g$ and preferably between 250 and 1600 $m^2/g$, in order to obtain a good absorbency of the ink vehicle. Preferably, the pigments included in the inkjet receiving coating or layer have an average pore volume of 0.2 to 3 ml/g, preferably between 1 and 3 ml/g. Pigments having an average particle size between 2 and 7 μm, an average surface area of 300 to 800 $m^2/g$ and an average pore volume between 1 and 2 ml/g give an ideal combination of absorbing capability, print quality and binding, i.e. the lack of dust release from the treated paper.

Preferably, a decor paper of the invention may be used in a method for manufacturing laminate panels, wherein such method comprises a step of providing the decor paper with thermosetting resin, such as melamine resin. For this reason, preferably the paper layer is only provided with an inkjet receiver coating at one side thereof, namely at the side comprising the digitally printed pattern. The other, opposite side, is preferably untreated, such that this opposite side shows the original porosity of the paper layer from which it is started. The resin may then be provided substantially from the bottom side into the papers core. Alternatively the resin may be provided to the base paper layer before the print is provided, e.g. such that a layer of resin is available between the digitally printed pattern and the base paper layer. In this case the resin may form the inkjet receiving surface, or an ink receiving layer is provided on top of the resin. Such ink receiving layer may have the same or similar composition as the ink receiving layers mentioned above.

It is clear that the invention may relate to a thermoplastic decor foil, instead of to a decor paper layer. The thermoplastic foil may be a polyvinylchloride (PVC) foil, polypropylene (PP) foil, polyethylene (PE) foil, polyethylene-terephthalate (PET) foil or thermoplastic polyurethane (TPU) foil. The preferred binder for use in an ink receiving layer on such foils is polyurethane based, acrylate based or polyvinyl acetate based. Further, in the case where the inkjet receiver coating is applied in at least two partial steps, the binder content in the first composition may be somewhat reduced as compared to the treatment of paper layers since less absorption into the core of the layer is expected. Preferably the pigment to binder ratio in the first composition is in such case between 1:1 and 6:1.

Preferably, the base paper layer or base foil of the invention is opaque and/or contains titanium oxide as a whitening agent. Preferably the printed pattern applied to the paper layer or foil of the invention, covers the majority, and preferably 80 percent or more of the surface of said paper layer Preferably, when manufacturing a laminate panel, a further resin layer is applied above the decor paper of the invention, e.g. by way of applying an overlay, i.e. a resin provided carrier layer, or a liquid coating, preferably while the decor layer is laying on a substrate, e.g. an MDF or HDF substrate, either loosely or already connected or adhered thereto.

The paper layer or foil of the invention may be a colored, pigmented and/or dyed base paper or foil. The use of a colored and/or dyed base layer enables further limiting the dry weight of deposited ink for attaining a particular pattern or color. In the case of paper, preferably the dye or pigment is added to the pulp before the paper sheet is formed. According to an alternative the ink receiving coating or layer on said paper layer or foil to be printed is colored or pigmented with colored pigments. In accordance with the general disclosure, however, the pigments contained in the inkjet receiver coating are preferably colorless or white.

Preferably the digitally printed pattern of the paper layer or foil of the invention is obtained by means of a digital inkjet printer that allows to jet ink droplets with a volume of less than 50 picoliters. In other words, the ink dot size of the paper or foil of the invention is preferably in average less than 45 micrometer in diameter. The inventors have found that working with droplets having a volume of 15 picoliters or less (i.e. dot size of 30 micrometer or less in diameter), for example of 10 picoliters, brings considerable advantages regarding the limitation of dry weight of deposited inks, while creating a large enough dot density, or definition, to allow a modified matrix to be blend in.

It is further clear that the paper or thermoplastic foil obtained in the first aspect of the invention is suitable for use as a decor paper, respectively decor foil, in a method for manufacturing floor panels, furniture panels, ceiling panels and/or wall panels.

The base paper of the decor paper of the invention preferably has a base paper weight, i.e. without ink receiving coating and printed pattern, higher than 20 grams per square meter, wherein, in the case of floor panels, a weight between 55 and 95 grams per square meters is obtained.

The base foil of the decor foil or the base paper of the decor paper of the invention preferably has a thickness of 0.05 millimeter or more, wherein a thickness between 0.05 and 0.5 millimeter is preferred.

Preferably said digitally printed pattern forms a representation of a wood grain, preferably with said wood grains running in the length direction of said decor paper or foil. The inventor has noticed that, doing so, a modified dot matrix and/or a matrix that is corrected on a nozzle level most easily blends in with a wood grain.

Preferably said decor paper or decor foil has a width of at least 1200 mm and preferably at least 2000 mm.

Preferably said digitally printed pattern is formed by means of a water-based pigmented inks, preferably at least from an ink set having the colors cyan, red, yellow and black.

BRIEF DESCRIPTION OF THE DRAWINGS

With the intention of better showing the characteristics according to the invention, in the following, as an example without limitative character, an embodiment is described, with reference to the accompanying drawings, wherein.

DESCRIPTION OF NON-LIMITING EMBODIMENTS

Figure 1:
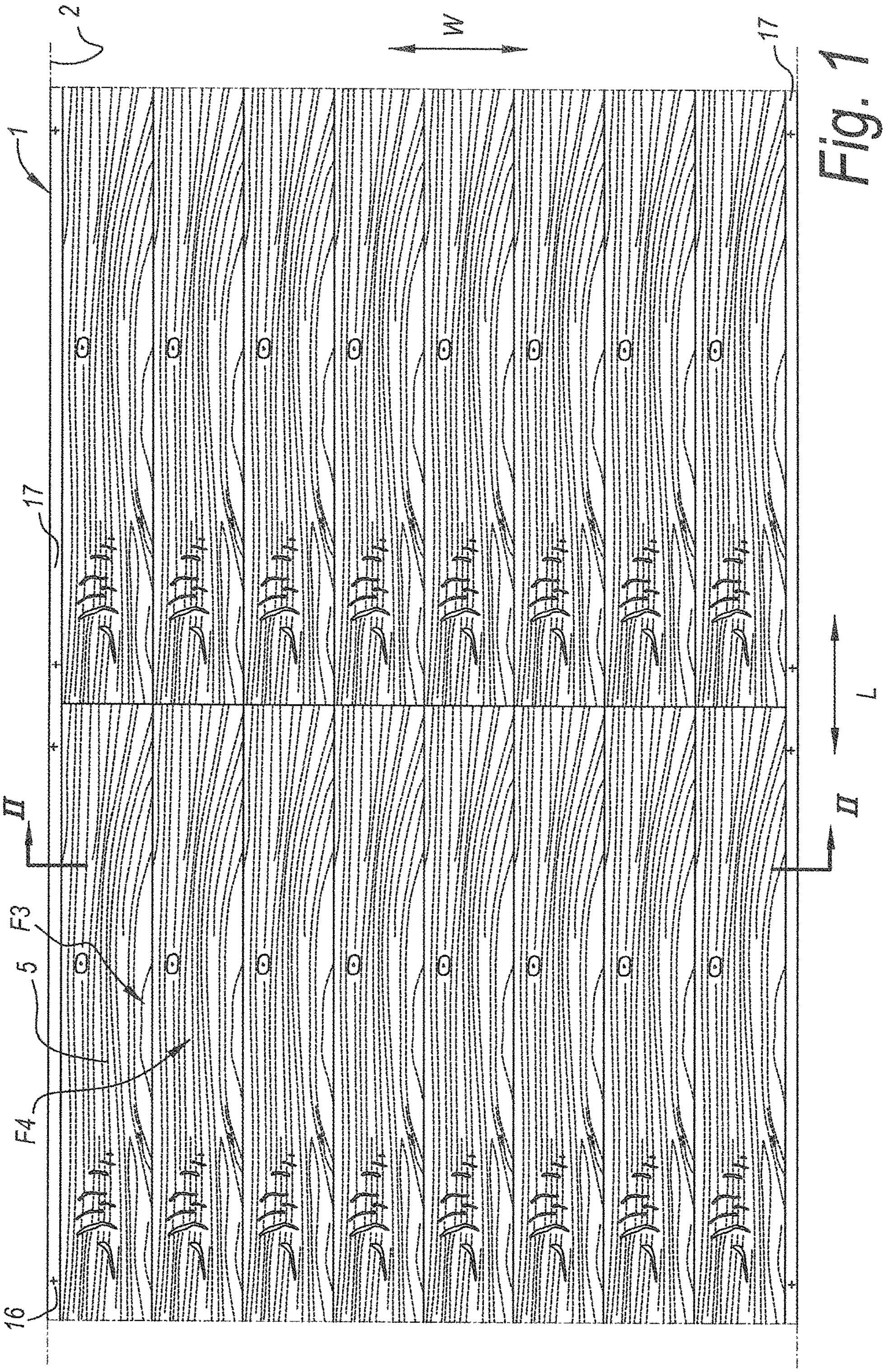
FIG. 1 in a top view represents a decor paper in accordance with the invention.

FIG. 1 gives a top view on a decor paper 1 in accordance with the invention. The decor paper 1 is part of a larger web 2, which could for example come from a roll. It is clear that alternatively the decor paper 1 may be available in sheet form.

Figure 2:
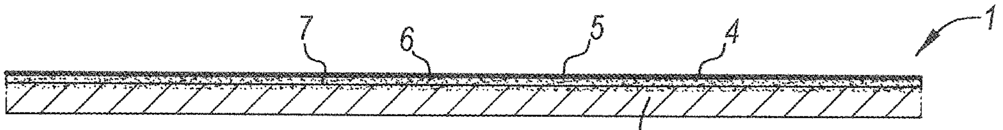
FIG. 2 at a larger scale gives a cross-section along the line II-II indicated on FIG. 1.

FIG. 2 shows that the decor paper 1 comprises a base paper layer 3 provided with an inkjet receiving surface 4 and a digitally printed pattern 5. The digitally printed pattern 5 is obtained via printing with a single-pass printer. In the present case the inkjet receiving surface 4 is formed by an inkjet receiver coating 6 provided at that side 7 of the base paper layer 3 comprising the digitally printed pattern 5. From FIG. 2 it is apparent that the inkjet receiver coating 6 penetrates the side 7 of the base paper layer 3 at least to some extent. In the represented example the base paper layer 3 is free from thermosetting resin or other liquidly applied and solidified filler materials. The base paper layer 3 is a standard printing paper having a Gurley value of about 20 seconds, and having a base paper weight of 70 grams per square meter.

Figure 3:
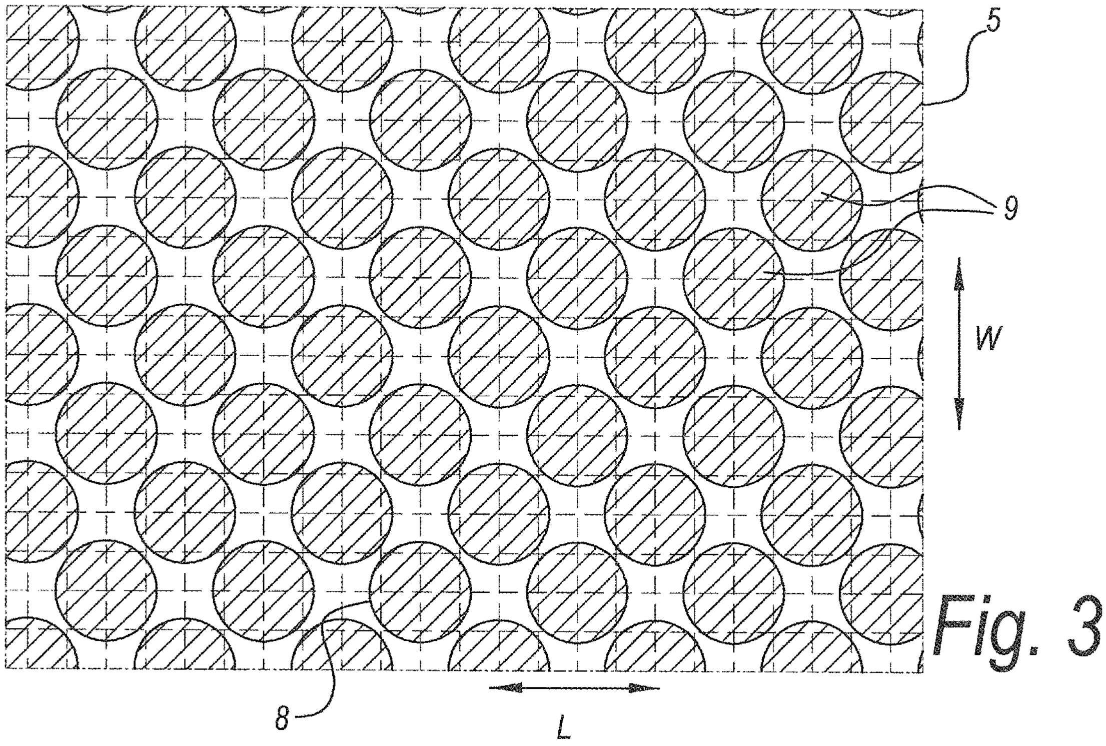
FIGS. 3 and 4 at a larger scale give a top view on the area F3, respectively F4, indicated on FIG. 1.

FIG. 3 shows that the digitally printed pattern 5 includes a matrix 8 of a plurality of printed ink dots 9 per inch. Said matrix 8, as seen in the width direction W of the paper, is generally uniformly made up with printed ink dots 9 of a common general size, as shown here. Of course in some areas greyscale or halftone printing may have been practiced, depending on the decor features printed. The latter is not shown here.

Figure 4:
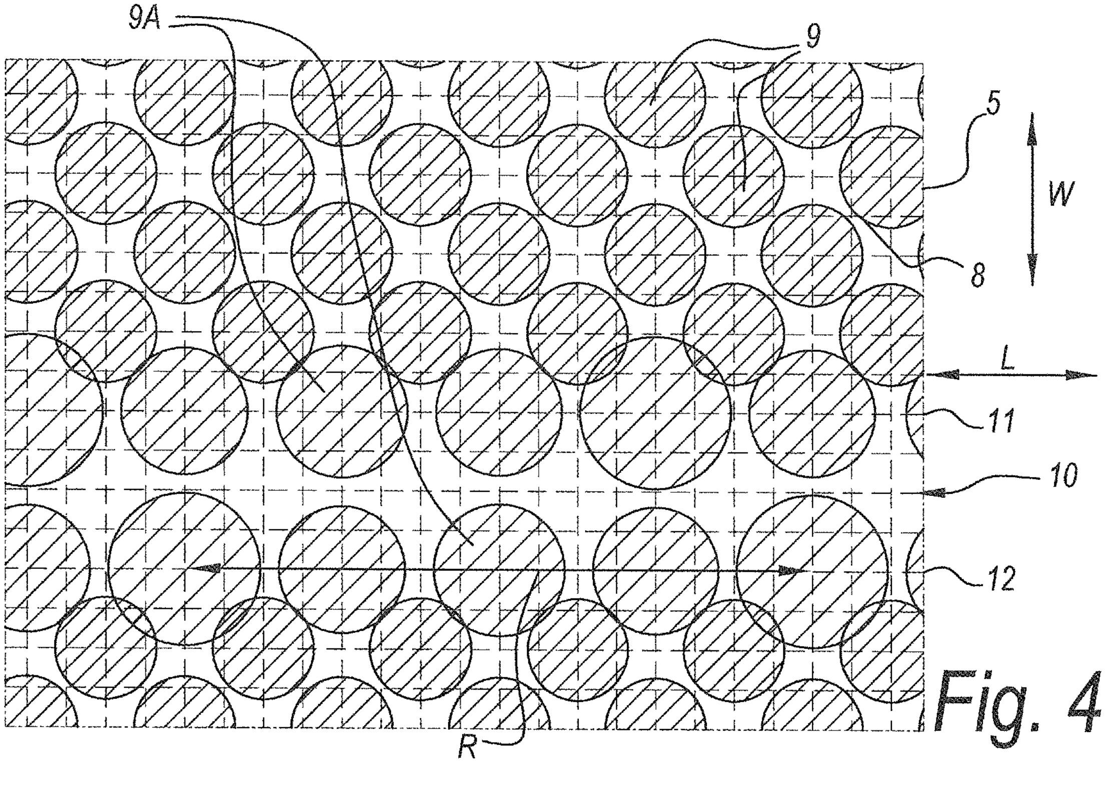

FIG. 4 shows an area of the printed pattern 5 where said matrix 8 is modified in accordance with the invention. In this case the modified matrix 8 aims at hiding a line 10 of missing dots created by a clogged or missing nozzle. The modification here comprises printed dots 9A of a dot size larger than said common general size on both dot lines 11-12 adjacent to the line 10 of the missing dots. As shown here a pattern comprising dots of two sizes is created. The pattern has a repeat length R of 4 dots.

Figure 5:
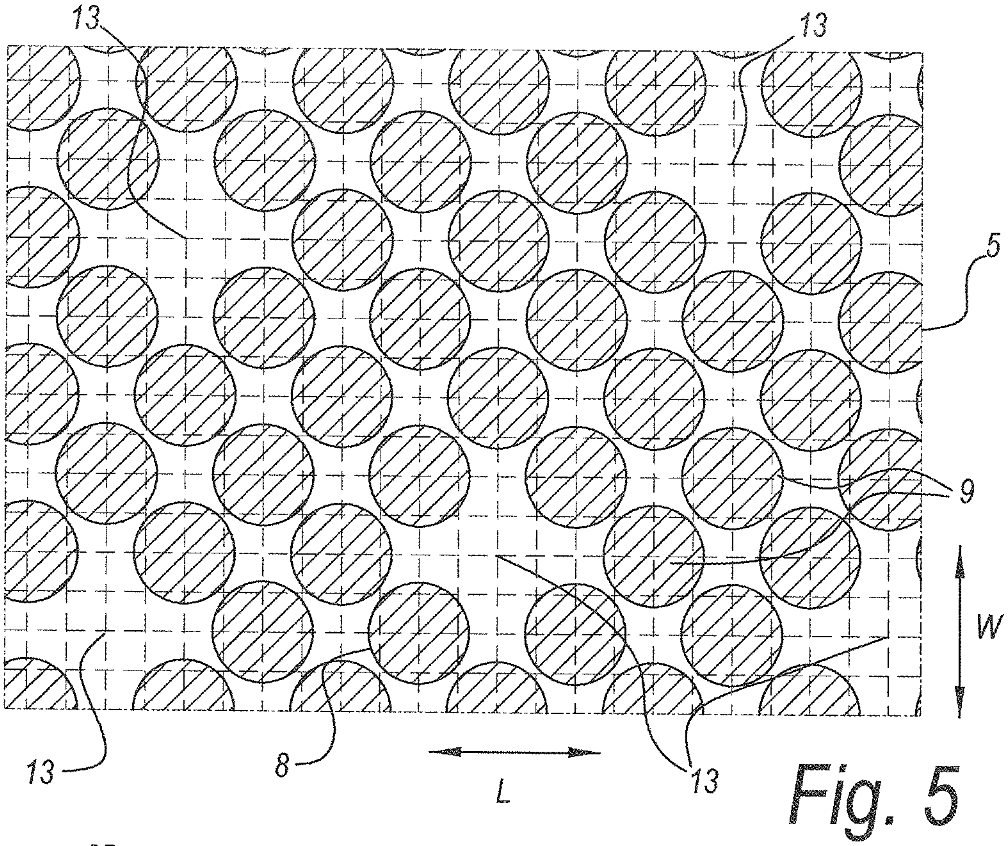
FIGS. 5 to 8 in a similar view as FIG. 4 represent variants.
Figure 6:
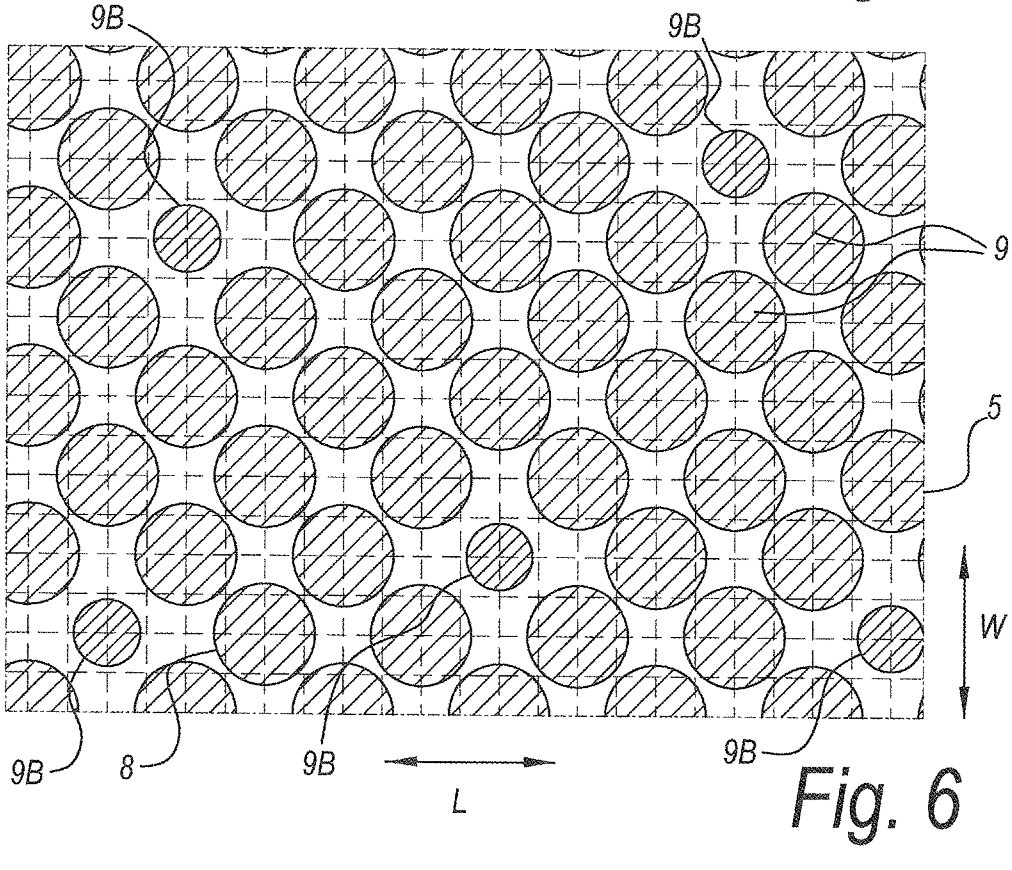

FIG. 5 shows another possibility of modification. In this case the modification aims at lowering the local color intensity and comprises the absence of printed dots from the matrix at predefined positions 13. The modification of FIG. 6 also aims at lowering the local color intensity and does so by the presence of ink dots 9B of a size smaller than the common general size.

Figure 7:
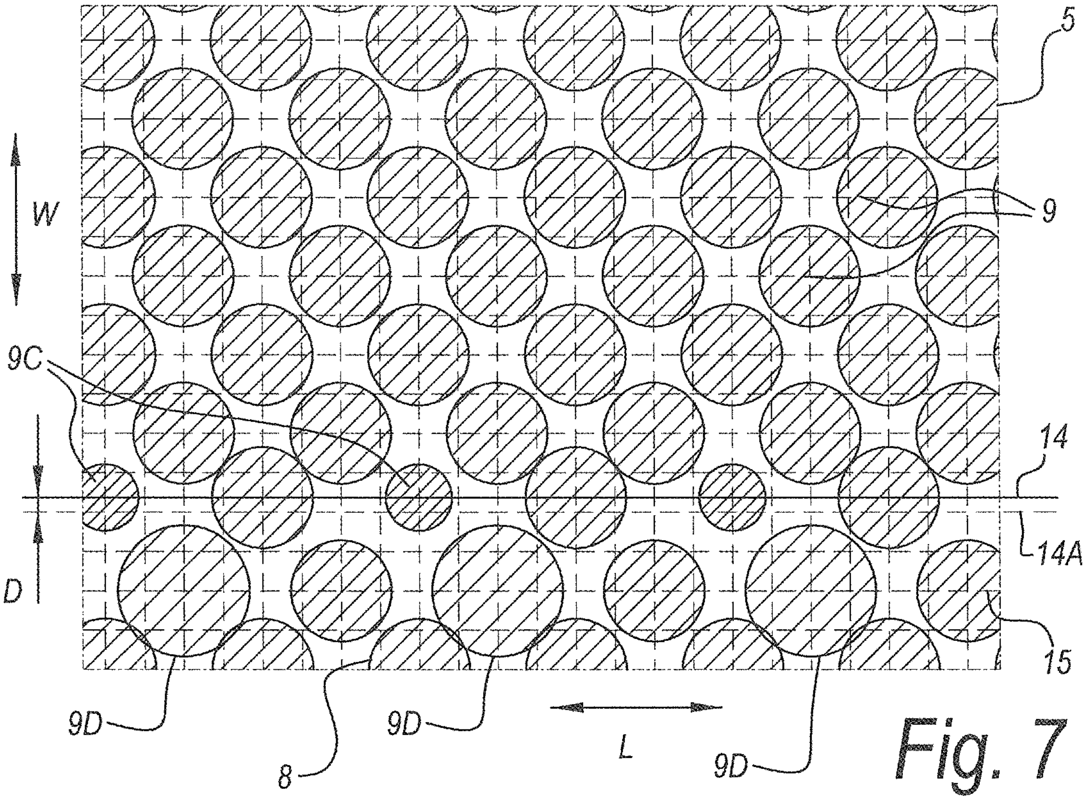

FIG. 7 shows yet another possibility of modification. In this case the modification aims at compensating for a directional error of position. In FIG. 7 the printed ink dots on line 14 are shifted over a distance D from the ideal line 14A of the square matrix 8. Such shift may give raise to visible color intensity variations. The modification of FIG. 7 aims at compensating by, according to the example, modifying the matrix 8 by decreasing the dot size of every second dot 9C on the shifted line 14A of dots, and by increasing the dot size of every second dot 9D on the neighboring dot line 15 opposite the direction of the offset.

Figure 8:
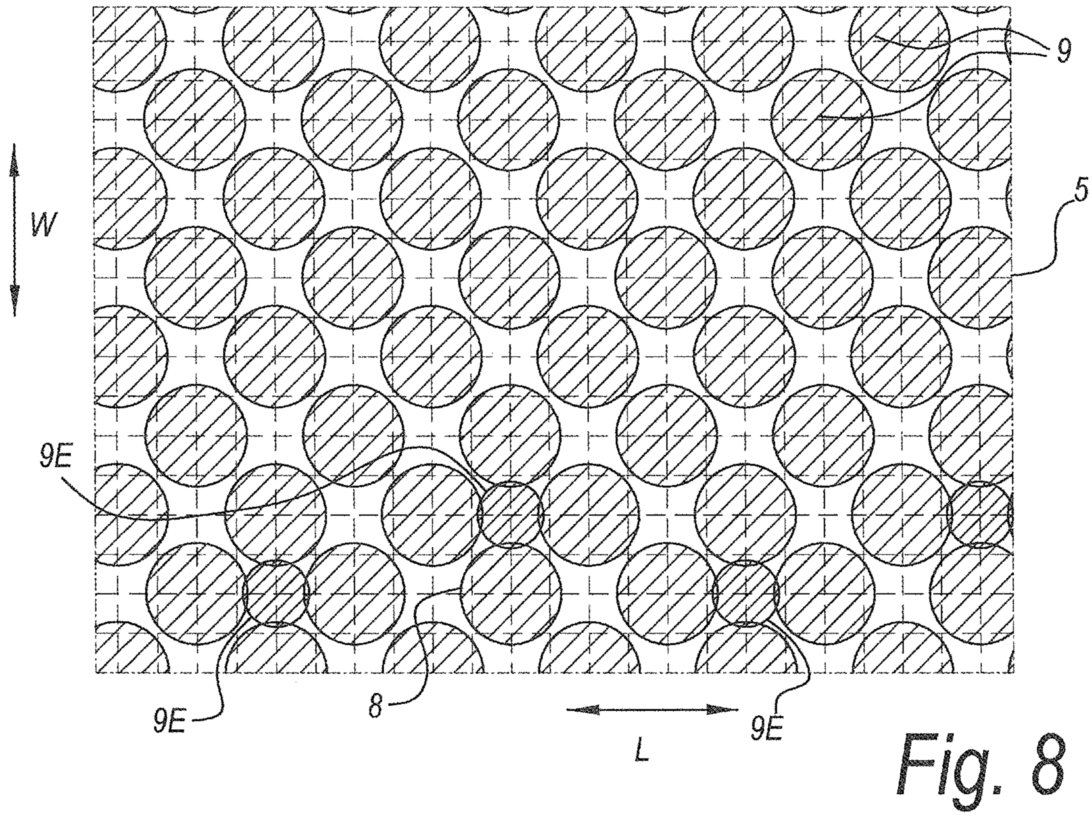

FIG. 8 shows yet another possibility of modification. In this case the modification of the matrix 8 aims at increasing the local color intensity and does so by comprising additional printed dots 9E, in this case of a smaller size.

With respect to FIGS. 3 to 8 it is clear that the modification of the matrix 8 as shown in these figures is preferably repeated over the length L of the decor paper 1 and/or the digitally printed pattern 5. Further it is noted that the lines of the square matrix 8, more particularly their intersections, represent the maximum attainable definition or resolution wherein, theoretically speaking, the center of one printed ink dot would coincide with each intersection. It is clear that, in the case of a single pass printer, the definition in the width direction W is defined by the print unit or print heads which extend in said width direction, while the definition in the length direction L may be adapted by varying the speed of the relative movement of the paper or foil passed the print unit. In accordance with the invention the resolution in the width direction W and in the length direction L is at least 200 dots per inch, but is preferably larger, e.g. at least 600, 850 or 1200 dots per inch in both directions.

With reference to FIG. 1, it is further remarked that the decor paper or foil of the invention may comprise markings 16 having a fixed position with respect to digitally printed pattern 5. Preferably these markings are placed outside the actual pattern, for example, as is the case here, in one or both longitudinally extending borders 17 of the sheet 2. Such markings 16 may be used in a method for manufacturing laminate panels, e.g. with the aim of positioning the digitally printed pattern with respect to a pressing device, a dividing operation, such as a saw or punch, and/or a milling operation.

It is further clear that the decor paper 1 of the example of FIG. 1 has been provided with a digitally printed pattern 5 forming a representation of a wood grain, in this case with said wood grains running in the length direction L of said decor paper 1.

It is noted that the examples of the figures illustrate embodiments of the first as well as of the second aspect of the invention as mentioned in the introduction.

The present invention is in no way limited to the above described embodiments, but such decor paper or foil may be realized according to several variants without leaving the scope of the invention.

What is claimed is:

1. A decor paper or foil for application to panel shaped substrates, the decor paper or foil comprising:

a base layer;

an inkjet receiving surface formed by an inkjet receiver coating that includes $CaCl_2$ as an ink destabilizing agent; and a digitally printed pattern obtained by printing with a single-pass printer and including a matrix of a plurality of printed ink dots per inch;

wherein the matrix, in the width direction of the paper or foil, is uniformly made up with uniformly sized printed ink dots, with the exception of a minority of an area of the printed pattern wherein the matrix is modified;

wherein the modification at least includes the presence of one or more printed dots in the matrix which have a smaller or a larger dot size;

wherein the digitally printed pattern is formed using water-based pigmented inks having only the colors cyan, red, yellow, and black; and wherein the digitally printed pattern forms a representation of a wood grain.

2. The decor paper or foil according to claim 1, wherein the modification comprises:

the availability of additional printed dots in the matrix; and/or the absence of printed dots from the matrix.

3. The decor paper or foil according to claim 1, wherein the area continuously extends in the length direction of the decor paper or foil.

4. The decor paper or foil according to claim 1, wherein the modification of the matrix concerns in width direction an individual dot, a pair of dots, or a series of dots smaller than six dots.

5. The decor paper or foil according to claim 1, wherein the modification is a correction for color intensity variations in the width direction.

6. A decor paper or foil for application to panel shaped substrates, the decor paper or foil comprising:

a base layer;

an inkjet receiving surface formed by an inkjet receiver coating that includes $CaCl_2$ as an ink destabilizing agent; and a digitally printed pattern obtained by printing with a single-pass printer having at least one inkjet head;

wherein the inkjet head includes a plurality of nozzles for firing ink droplets, each droplet forming an ink dot;

wherein the digitally printed pattern includes a matrix of a plurality of printed ink dots per inch;

wherein the matrix, in the width direction of the paper or foil, is uniformly made up with uniformly sized printed ink dots, with the exception of a minority of an area of the printed pattern wherein the matrix is modified;

wherein the digitally printed pattern includes areas in which the matrix is corrected on a nozzle level;

wherein the correction at least includes the modification of the dot size of one or more of the printed dots in the matrix;

wherein the digitally printed pattern is formed using water-based pigmented inks having only the colors cyan, red, yellow, and black; and wherein the digitally printed pattern forms a representation of a wood grain.

7. The decor paper or foil according to claim 6, wherein the correction is based on an earlier printed image.

8. The decor paper or foil according to claim 6, wherein the correction comprises:

the addition of extra printed dots to the matrix; and/or the omission of printed dots from the matrix.

9. The decor paper or foil according to claim 6, wherein the correction at least comprises a shifted dot position of relevant printed ink dots.

10. The decor paper or foil according to claim 1, wherein the inkjet receiver coating includes at least a binder and pigments.

11. The decor paper or foil according to claim 10, wherein the pigments are present in the inkjet receiver coating mainly in a layer adjacent to a surface of the base layer, while being absent, or present in a significantly lower amount, in an upper layer of the inkjet receiver coating.

12. The decor paper or foil according to claim 10, wherein an upper layer of the inkjet receiver coating further comprises a flocculating agent.

13. The decor paper or foil according to claim 1, wherein the decor paper or foil has a width of at least 1200 mm.

* * * * *